(12) United States Patent
Granlind

(10) Patent No.: US 8,505,948 B2
(45) Date of Patent: Aug. 13, 2013

(54) BOAT TRANSPORTATION CARRIAGE

(75) Inventor: Ingmar Granlind, Oregrund (SE)

(73) Assignee: Sublift AB, Oregrund (SE)

( * ) Notice: Subject to any disclaimer, the term of this patent is extended or adjusted under 35 U.S.C. 154(b) by 0 days.

(21) Appl. No.: 13/698,510

(22) PCT Filed: May 19, 2011

(86) PCT No.: PCT/SE2011/050631
§ 371 (c)(1),
(2), (4) Date: Nov. 16, 2012

(87) PCT Pub. No.: WO2011/146010
PCT Pub. Date: Nov. 24, 2011

(65) Prior Publication Data
US 2013/0056955 A1 Mar. 7, 2013

(30) Foreign Application Priority Data
May 19, 2010 (SE) .................................... 1000528

(51) Int. Cl.
*B60P 3/10* (2006.01)

(52) U.S. Cl.
USPC ........................ 280/414.1; 114/344

(58) Field of Classification Search
USPC .............................. 280/414.1, 414.3; 114/344
See application file for complete search history.

(56) References Cited

U.S. PATENT DOCUMENTS

| 4,858,943 | A * | 8/1989 | Cote | 280/414.1 |
| 4,895,387 | A * | 1/1990 | Hawkins et al. | 280/414.1 |
| 7,547,032 | B1 * | 6/2009 | Roberts | 280/414.1 |
| 8,256,789 | B2 * | 9/2012 | Bryant, II | 280/414.1 |

FOREIGN PATENT DOCUMENTS

| SE | 465026 B | 7/1991 |
| SE | 501759 C2 | 8/1995 |
| SE | 521622 C2 | 11/2003 |
| WO | WO 03089268 A1 | 10/2003 |

OTHER PUBLICATIONS

International Search Report of International Application No. PCT/SE2011/050631, date of mailing of search report, Aug. 18, 2011.
International Preliminary Report on Patentability of International Application No. PCT/SE2011/050631, date of completion of this report, Jul. 2, 2012.

* cited by examiner

*Primary Examiner* — Tashiana Adams
(74) *Attorney, Agent, or Firm* — Mintz Levin Cohn Ferris Glovsky and Popeo, P.C.

(57) ABSTRACT

The present invention comprises an arm structure adapted for a boat transportation carriage. The boat transportation carriage may include a first frame portion and a second frame portion, with a third frame portion adapted to interconnect said two frame portions. Said arm structure may include a vertical arm portion and a horizontal arm portion, with the lower portion of the vertical arm portion being adapted indirectly to to rest against a chassis of the boat transportation carriage and its frame portion for supporting vertical loads. Between the lower portion of the horizontal arm portion and the upper portion of said chassis or frame portion and in adherement to the vertical arm portion there rests a support plate having a supporting surface for supporting cooperation with the horizontal arm portion and this supporting surface is disposed within a chosen intermediate area of said horizontal arm portion.

24 Claims, 3 Drawing Sheets

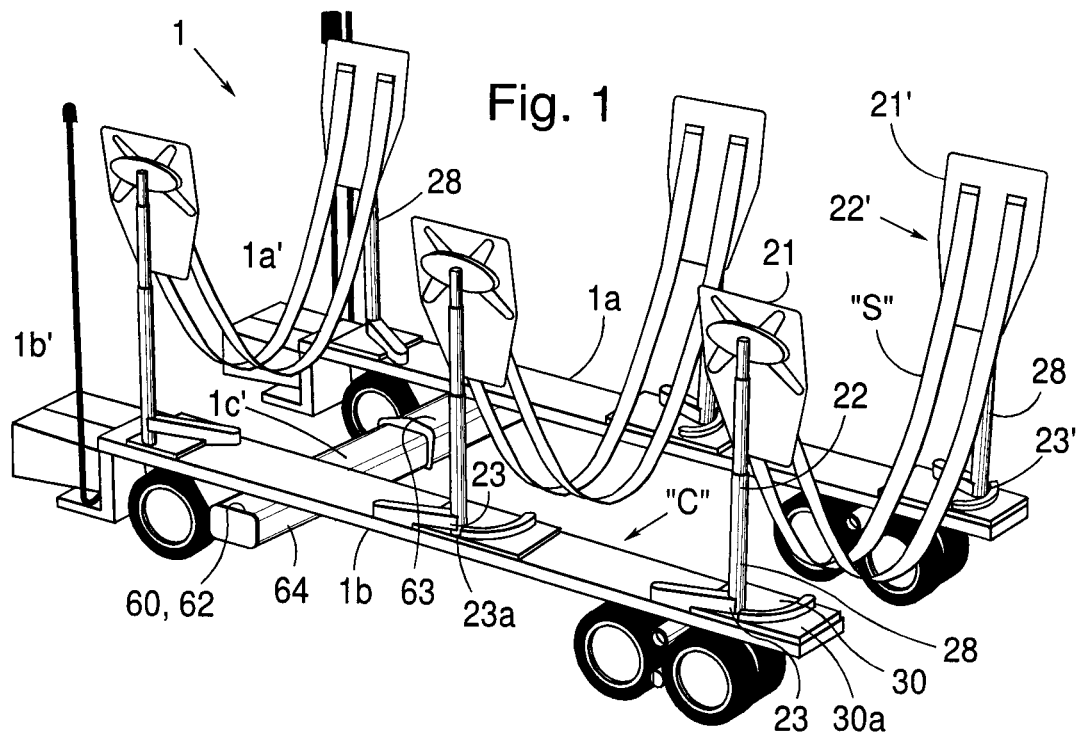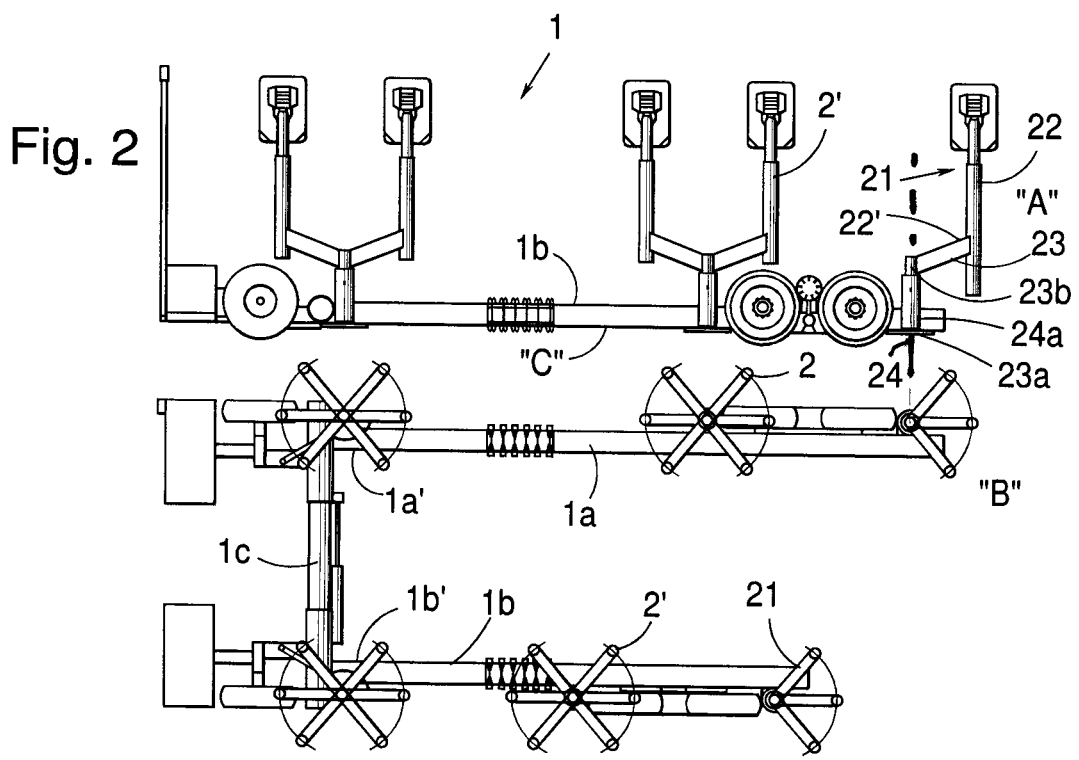

Figure 5:
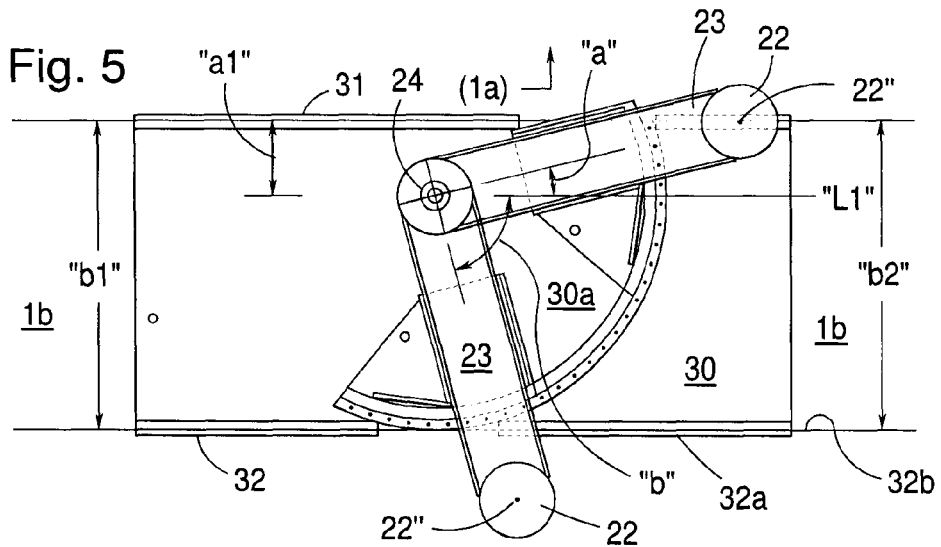

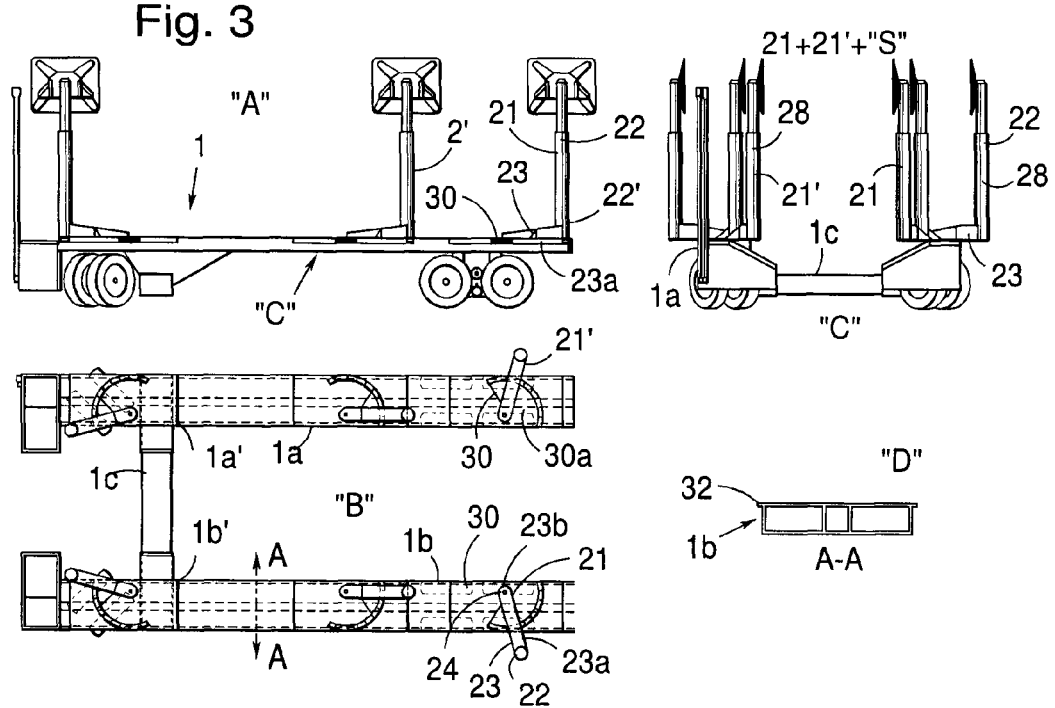
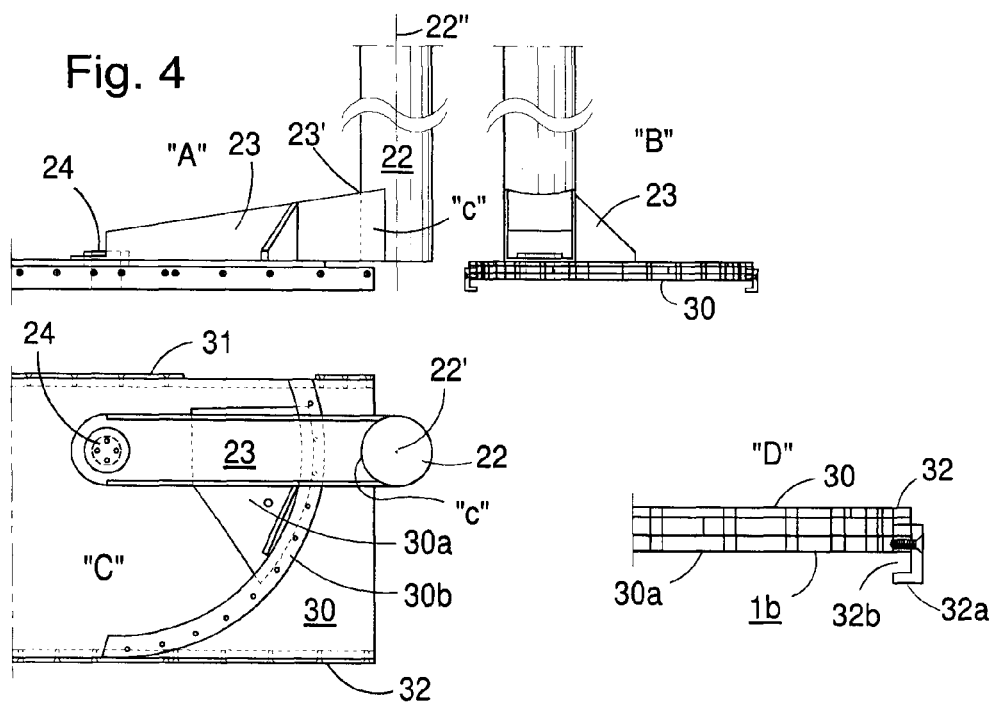

BOAT TRANSPORTATION CARRIAGE

CROSS-REFERENCE TO RELATED APPLICATIONS

The present application is a 35 U.S.C. §371 national stage entry of PCT/SE2011/050631, which has an international filing date of May 19, 2011 and claims priority to Swedish Patent Application No. 1000528-8, filed on May 19, 2010, the disclosures of which are incorporated herein in their entireties by reference.

TECHNICAL FIELD OF THE INVENTION

This invention generally refers to a boat transportation carriage and especially to a carriage having self propelling means.

A boat transportation carriage of the relevant type is adapted to exhibit two elongated frame portions, parallel to, or at least essentially parallel to, each other and along amidships plane, a first frame portion and a second frame portion, with a third frame portion being adapted to transversely connect said two frame portions within frame portion sections belonging to the front sections of the two frame portions for forming a chassis, shaped as a "U".

Arm structures, which could be one, two, four, six or more in number, are each adapted to exhibit on the one hand a vertically extending arm portion and on the other hand a horizontally, or essentially horizontally, extending arm portion, wherein the lower portion of the vertically extending arm portion is rigidly and solidly connected to a horizontally movable arm of the horizontally extending arm portion, whose oppositely directed arm is over a vertically extending axis of rotation rotatably disposed around said axis of rotation, with the lower portion of the horizontally extending arm portion being adapted to rest against a chassis portion belonging to the boat transportation carriage for taking up its allotted portion of the vertical loads that are to be taken from the displacement of a boat, supported by belts of the boat transportation carriage.

The invention has been made in order to disclose necessary structures of a boat transportation carriage, which can support and transport boats having a displacement of at least 75 tons. It is based on an earlier known boat transportation carriage, disclosed in the enclosed FIG. 2 and dimensioned for only a displacement of 40 tons.

The present invention can of course find use as boat transportation carriages for boats having other displacements than the ones mentioned above.

The present invention has as its goal to simplify the construction of a self propelled boat transportation carriage, by;
  a. simplify the construction of two or more arm structures to transfer the load of the boat towards the first and the second frame portions and to center the supporting load towards each parallel frame portion, oriented above a wheel, above a pair of wheels and/or above two pairs of wheels;
  b. simplify the construction of the "U"-formed carriage and adapt it suitable for an irregular transporting path, where the first and the second frame portions may be moved individually up and down respectively within a small horizontal direction and using a third frame portion, with a unique cross section, as a torsion element for a larger horizontal direction and to use axial bearings, in order to facilitate the adaptation of the breadth;
  c. when disassembled simplify the construction of the "U"-formed carriage by using three units, one as the first frame portion, a second as the second frame portion and a third as the third frame portion, and where these units may be easily assembled together and easily disassembled and in a disassembled state cover a volume, (breadth, length and/or height), adapted to be includes in a standard container, adapted for container ship frights.

BACKGROUND OF THE INVENTION

Methods, arrangements and constructions related to the technical field and structure mentioned above are known in a plurality of different embodiments.

As a first example of the background of technology and the technical field to which the present invention refers may be mentioned an arm structure adapted for a boat transportation carriage, said structure being dimensioned for boats having a displacement of 40 tons, in accordance with the embodiment shown and disclosed in the following, with reference to FIG. 2.

This earlier known boat transportation carriage is adapted as its basic concept to exhibit two elongated frame portions, being parallel to, or at least essentially parallel to, and disposed along the amidships plane or fore- and aft-plane and having said frame portions coordinated with each other, a first and a second frame portion, and with a third frame portion adapted to connect said two frame portions transversely within the frame portion belonging to the front frame portion sections for orientation for forming a "U"-shaped chassis with the two frame portions forming legs of the boat transportation carriage.

Each of said arm structure is adapted to exhibit on the one hand a vertically extending first arm portion and on the other hand a horizontally extending second arm portion, wherein the lower section or portion of the vertically extending arm portion is to be rigidly and solidly connected to a freely movable arm, forming the horizontally extending arm portion, whose arm portion is over a vertically extended axis of rotation rotatable around an axis of rotation.

The lower portion of the vertically extending arm portion is adapted to rest against a chassis, belonging to the boat transportation carriage, and one of its leg-forming frame portions for taking up its allotted portion of the vertical loads, which are based on the deplacement of a boat carried by the boat transportation carriage.

A more specific study of the structure indicated here discloses that the vertical forces, which will operate over the vertically disposed arm portion and the horizontally disposed arm portion, are to be taken up as a torque by one or more used bearing means.

Further it is previously known to having said third frame portion formed as a shaft (having a circular cross section) and that any horizontally torque, between the first and the second frame portions, due to their different vertical movements, are to be transferred to said third frame portion.

DISCLOSURE OF THE PRESENT INVENTION

Technical Problem

If the circumstance is considered, that the technical considerations which a person skilled in the relevant technical art will have to carry out in order to offer a solution of one or more occurring technical problems are initially on the one hand having a necessary insight into the measures and/or the sequence of measures which will have to be carried out and on the other hand having a necessary choice of the one or more means which will be necessary in consideration of this, the following technical problems should be relevant in structuring the present subject of invention.

Considering the earlier viewpoint of technology, as it has been described above, it should therefore be seen as a technical problem to understand the significance of, the advantages related to and/or the technical measures and considerations which will be required for simplifying the construction of a boat transporting carriage and to simplify the construction of a "U"-formed carriage, by having the carriage adapt with arm constructions suitable for an irregular transporting path, where the first and the second frame portions with its arm constructions may be moved up and down respectively in a horizontal direction and using a third frame portion, with a unique cross section, partly as a torsion element and to use axial bearings in order to facilitate the adaptation of the breadth of the carriage via the length of third frame portion.

It is a technical problem to simplify the construction of a "U"-formed, self propelled, carriage by using essentially only three units, a first as the first frame portion, a second as the second frame portion and a third as the third frame portion, and where these three units may be easily assembled together and easily disassembled and in a disassembled state cover a volume, breadth, length and/or height, adapted to be included in a standard container adapted for ship container frights, where the breadth dimension for a carriage, adapted for a deplacement of 75 tones or the like, is critical.

It is a technical problem in being able to understand the significance of, the advantages related to and/or the technical measures and considerations which will be required in an arm structure adapted for a boat transportation carriage, with the boat transportation carriage being adapted to exhibit two elongated, parallel with, or at least substantially parallel with, frame portions disposed along the amidships or fore- and aft-plane and with frame portion coordinated with each other, a first frame portion and a second frame portion, with a third frame portion adapted to interconnect said two frame portion within, disposed adjacent to the bow of the boat, the frame portion sections belonging to the bow portions for forming a "U"-shaped chassis, said arm structure being adapted to exhibit on the one hand a vertically extending arm portion and on the other hand a horizontally extending arm portion, with the lower part of the arm portion extending vertically being in rigid and solid connection with a freely movable area related to the horizontally extended arm portion, whose oppositely directed area is, over a vertically extending axis of rotation, rotatable around said axis of rotation, with the lower portion of the vertically extending arm portion being adapted to rest directly or indirectly against said "U"-shaped chassis belonging to the transportation carriage for taking up its allotted portion of the vertical loads, which are to be allotted by the displacement of a boat supported by the boat transportation carriage, and in such an arm structure creating prerequisites for a simple structure while taking up large vertical forces and therewith associated active torque in the horizontal plane adjacent to an axis of rotation related to the chassis.

There is a technical problem in being able to understand the significance of, the advantages related to and/or the technical measures and considerations which will be required for utilizing an earlier known structure having its arms displaceably disposed along its coordinated frame portion but where to this structure an individual or displacement possibility of the arms in pairs is indicated on the one hand in the lengthwise direction of the frame portions and on the other hand in their crosswise direction.

There is a technical problem in being able to understand the significance of, the advantages related to and/or the technical measures and considerations which will be required for utilizing a supporting disc element, which is lengthwise displaceable and which may be held solidly and which is to be affixed to its frame portion over a guide system, disposed on both of the longitudinal sides of the frame portion.

There is a technical problem in being able to understand the significance of, the advantages related to and/or the technical measures and considerations which will be required for, between a horizontally extending lower portion of an arm and said chassis and in connection with the vertically extending arm portion, letting a support disc element, dimensioned for primarily vertical pressure forces, be attached or rest, with said support disc element being allotted to a specifically shaped supporting surface for supporting cooperation with the horizontally extending arm portion.

There is a technical problem in being able to understand the significance of, the advantages related to and/or the technical measures and considerations which will be required for having this supporting surface be oriented within a particularly chosen intermediate area of said horizontally extending arm portion.

There is a technical problem in being able to understand the significance of, the advantages related to and/or the technical measures and considerations which will be required for letting the supporting surface be disposed in the middle portion of between 70% and 20% of the total length of the horizontal arm portion, measured or counted between said axis of rotation and an allotted center line, such as an allotted center line of said vertically extending arm portion.

There is a technical problem in being able to understand the significance of, the advantages related to and/or the technical measures and considerations which will be required for letting the intermediate portion be chosen to between 20% and 40% of the total length of the horizontal arm portion, counted from a center line allotted to said vertically extending arm portion.

There is a technical problem in being able to understand the significance of, the advantages related to and/or the technical measures and considerations which will be required for letting the support disc element be allotted a rectangular and horizontal surface extension, with a lower surface facing one of the frame portions of the chassis and having parallel edges of rectangular surface extension and the lower surface being allotted parallel guides for cooperation with parallel tracks (or strips) in the longitudinal edges of the frame portion or vice versa.

There is a technical problem in being able to understand the significance of, the advantages related to and/or the technical measures and considerations which will be required for having the supporting surface be allotted part of the shape of a circle with a chosen radian measure defined in degrees as here.

There is a technical problem in being able to understand the significance of, the advantages related to and/or the technical measures and considerations which will be required for letting the radian measure be chosen from 10° to 30°, from a line parallel to its own frame portion and in a direction towards a second parallel frame portion.

There is a technical problem in being able to understand the significance of, the advantages related to and/or the technical measures and considerations which will be required for letting the radian measure be chosen from 60° to 90°, from a line parallel to its own frame portion and in a direction from a second parallel frame portion.

There is a technical problem in being able to understand the significance of, the advantages related to and/or the technical measures and considerations which will be required for letting the vertical axis of rotation be oriented within the supporting disc element and at a distance from the edge of a supporting disc element for one of the arm portions, which faces a second parallel arm portion corresponding to between 15% and 30% of the width between the edges of the supporting disc element, which is allotted.

There is a technical problem in being able to understand the significance of, the advantages related to and/or the technical measures and considerations which will be required for letting the supporting surface have a shape of a circular segment allotted a radian measure which is to be able to extend between 30° and 110°.

There is a technical problem in being able to understand the significance of, the advantages related to and/or the technical measures and considerations which will be required for between two arm structures, one for each one of said two frame portions, having a supporting carrier (a sling) or the like for forming an arrangement with two arm structures having telescopically oriented arm portions and a carrying strap.

There is a technical problem in being able to understand the significance of, the advantages related to and/or the technical measures and considerations which will be required for having at least two arm arrangements adapted with individual supporting discs which are disposable along their allotted frame portions.

There is a technical problem in being able to understand the significance of, the advantages related to and/or the technical measures and considerations which will be required for letting the vertical arm portion and the horizontal arm portion allotted thereto be adapted to cooperate with such supporting disc elements, which may be reversed as compared to the first and/or the second frame portion.

There is a technical problem in being able to understand the significance of, the advantages related to and/or the technical measures and considerations which will be required for letting the vertical arm portion and the horizontal arm portion, as compared to their frame portion or frame portions, be adjustable individually or in pairs in each utilized arm arrangement both in the direction of the frame portion and in the crosswise direction of the frame portion.

There is a technical problem in being able to understand the significance of, the advantages related to and/or the technical measures and considerations which will be required for letting the vertical arm portion and the horizontal arm portion receive their stability by a chosen vertical rotatable attachment in the supporting disc element, in combination with a guide or supporting surface in the form of an arc of a circle, said guide or surface surrounding a segment of a circle which is coordinated to be stable and/or attached in the horizontal arm portion and thereby is offered attachment of the vertical arm portion in the center, said arm portion being dimensioned for being able to surround a (hydraulic or pneumatic) lifting cylinder adapted to support a carrying strap.

There is a technical problem in being able to understand the significance of, the advantages related to and/or the technical measures and considerations which will be required for letting the vertical arm portion via the horizontal arm portion be adapted to be placed outside of the supporting disc element and edges of its coordinating frame portion, with distributed vertical forces acting on the horizontal arm portion and on the supporting frame portion.

There is a technical problem in being able to understand the significance of, the advantages related to and/or the technical measures and considerations which will be required for letting said elongated first frame portion and said elongated second frame portion be coordinated to each other with said third frame portion, via a rotational bearing arrangement, adapted for permitting a small individual vertical movement of said first and second frame portions in relation to said third frame portion.

There is a technical problem in being able to understand the significance of, the advantages related to and/or the technical measures and considerations which will be required for letting each of two of said bearing arrangements be formed as a bolt and nut or the like threading arrangement.

There is a technical problem in being able to understand the significance of, the advantages related to and/or the technical measures and considerations which will be required for letting two bolt and nut arrangements be related to the first frame portion and its bow related section, that two bolt and nut arrangements be related to the second frame portion and its bow related section.

There is a technical problem in being able to understand the significance of, the advantages related to and/or the technical measures and considerations which will be required for letting two bolt and nut arrangements each be related to away facing outer surface sections of resp. frame portion.

There is a technical problem in being able to understand the significance of, the advantages related to and/or the technical measures and considerations which will be required for letting a common rotation axis be extending between said bolt and nut arrangements and said third frame portion, shaped in a cross section with a hollow rectangular form or the like.

There is a technical problem in being able to understand the significance of, the advantages related to and/or the technical measures and considerations which will be required for letting said third frame portion and hollow sleeve arrangements, related to said first frame portion and said second frame portion, exposing axial bearings.

There is a technical problem in being able to understand the significance of, the advantages related to and/or the technical measures and considerations which will be required for letting said axial bearings be related to the ends of said third frame portion and to the ends facing towards each other, of said sleeves.

There is a technical problem in being able to understand the significance of, the advantages related to and/or the technical measures and considerations which will be required for letting said first frame portion and said second frame portion be adapted to be arranged closely or adjacently to each other and side by side and in such a position exhibiting or exposing a breadth dimension adapted to a standard container for container ship frights.

There is a technical problem in being able to understand the significance of, the advantages related to and/or the technical measures and considerations which will be required for letting a first frame portion related sleeve and a second frame portion related sleeve be adapted to cooperate with a shortened third frame portion.

The Solution

As its starting point the present invention takes the known technology mentioned by way of introduction and is based on a boat transporting carriage and to simplify the construction of said carriage, such as to simplify the construction of the "U"-formed carriage and adapt it suitable for an irregular transporting path, where the first and the second frame portions may individually be moved up and down respectively in a horizontal direction and using the third frame portion, with a unique cross section, as a torsion element and to use axial bearings in order to facilitate the adaptation of the breadth, such as to simplify the construction of the "U"-formed carriage by using three units, one as the first frame portion, a second as the second frame portion and a third as the third frame portion, and where these units may be easily assembled together and easily disassembled and in a disassembled state cover a volume, breadth, length and/or height, adapted to be includes in a standard container adapted for ship frights and suggesting two or more arm structures to transfer the load of the boat towards the first and the second frame portions and to center the supporting load towards each parallel frame portion, oriented above a wheel, above a pair of wheels and/or above two pairs of wheels and suggest an arm structure adapted for a boat transportation carriage, said boat transportation carriage being adapted to exhibit two elongated, parallel to, or at least essentially parallel to, frame portions disposed along an amidships (fore- and aft-plane) plane of the boat, and with coordinated frame portions, said first frame portion and a second frame portion, with a third frame portion adapted to transversely connect said two frame portions disposed adjacent to the bow of the boat and belonging to the portions of the bow of the boat for forming a chassis having the form of a "U", with the arm structure being adapted to exhibit on the one hand a vertically extending arm portion and on the other hand a horizontally extending or essentially horizontally extending arm portion, with the lower part of the vertically extending arm portion being in a rigid and solid connection with a freely movable area extending along the horizontally extending arm portion, the reversely directed area or section of which is, over a vertically extending axis of rotation, rotatably disposed around said axis of rotation, with the lower portion of the vertically extending arm portion being adapted to rest directly or indirectly against a chassis surface belonging to the boat transportation carriage for supporting its allotted portion of vertical loads which are to be related to the deplacement of a boat carried by the boat transportation carriage.

In order to be able to solve one or more of the technical problems mentioned above the present invention more particularly indicates that the thus known technology is to be supplemented by a supporting disc element, primarily dimensioned for vertical pressure forces, being disposed between the horizontally extending lower area of an arm portion and said chassis and in connection with a vertically extending arm portion, and that this supporting disc element is to be allotted a supporting surface for a supporting cooperation with the horizontally extending arm portion, with this supporting surface being disposed within a chosen middle area of said horizontally extending arm portion.

As proposed embodiments falling within the frame of the basic concept of the present invention it is also indicated that the supporting surface is to be disposed within an intermediate area of between 70% and 20% of the total length of the horizontal arm portion, measured or counted between said axis of rotation and a center line allotted to said vertically extending arm portion.

The intermediate area can then be chosen to between 20% and 40% of the total length of the horizontal arm portion counted from a center line allotted to said vertically extending arm portion.

The support disc element can then to advantage be allotted a rectangular and horizontal surface extension having a lower (under) surface facing one of the frame portions of the chassis and with parallel edges of the rectangular surface extension, whereas the lower surface is to be allotted parallel guides for cooperation with parallel tracks or strips or vice versa in the frame portion.

The active supporting surface is then to be allotted a portion of the shape of a circle having a chosen radian measure, such as a radian measure counted in degrees.

The radian measure can then be chosen to 10° to 30° from a line parallel to one of its frame portions and in the direction of a second frame portion positioned parallel thereto.

The radian measure can also be chosen to be between 60° to 90° from a line parallel to one of its frame portions and in a direction from a second frame portion.

The vertical axis of rotation can to advantage be disposed in the supporting disc, viz. at a distance from the edge of a supporting disc element for one of the frame portions facing a second frame portion corresponding to between 15% and 30% of the width allotted to the supporting disc element between the edges of said supporting disc element and/or said frame portion.

The supporting surface is to advantage to be shaped as a circular segment allotted a radian measure of between 30° and 110°.

Between two arm structures, one for each one of said two parallel frame portions, there extends a boat supporting strap (a sling) or the like for forming a complete arm arrangement having telescopically disposed arm portions via individual lift cylinders.

At least two arm arrangements are to be disposed with individual supporting disc elements, both of which are individually displaceable along the frame portion allotted thereto.

The vertical arm portion and the horizontal arm portion allotted thereto are adapted to cooperate with a single supporting disc element, which is reversible as compared to the first and/or the second frame portions.

The vertical arm portion and the horizontal arm portion are, with regard to the frame portion or frame portions, adjustable individually or in pairs in a complete arm arrangement, both in the lengthwise direction of the frame portion and in the crosswise direction of the frame portion.

The vertical arm portion and the horizontal arm portion can to advantage be lended their stability by a chosen vertical rotatable attachment in the supporting disc element in combination with a guide in the form of a circular arc or a supporting surface which surrounds a segment of a circle which is stably coordinated and/or fastened in the horizontal arm portion and thereby is offering a collateral center attachment of the vertical arm portion which is dimensioned so as to be able to surround a lifting cylinder adapted for a carrier strap.

The vertical arm portion is adapted to have its center line disposed outside of the supporting disc element and frame portion with distributed vertical forces affecting the horizontal arm portion and the supporting frame portion over a supporting plate.

The present invention further suggests that said elongated first frame portion and said elongated second frame portion are coordinated to each other with said third frame portion via rotational bearing arrangements, adapted for permitting a small individual vertical movement of said first and second frame portions in relation to said third frame portion.

Additionally the present invention discloses that each of two of said bearing arrangements are to be formed as a bolt and nut arrangement or the like arrangement.

Two bolt and nut arrangements are to be related to the first frame portion and its bow related section, that two bolt and nut arrangements are related to the second frame portion and its bow related section.

Two bolt and nut arrangements are each related to away facing outer surface sections of resp. first and second frame portion.

A common rotation axis is to be extending between said bolt and nut arrangements and said third frame portion, shaped in a cross section with a hollow rectangular form or the like.

Said third frame portion and its hollow sleeve arrangements, related to said first frame portion and said second frame portions, are exposing axial bearings.

Said axial bearings are related to the ends of said third frame portion and to the ends of said sleeves, facing towards each other.

Said first frame portion and said second frame portion are adapted to be arranged closely or adjacently to each other and side by side and in such a position exhibiting or exposing a breadth dimension adapted to a standard container for container shipping frights.

A first frame portion related first sleeve and a second frame portion related second sleeve are adapted to cooperate with a shortened intermediate third portion.

Advantages

The advantages that primarily must be considered to be characteristic of the present invention and the specific significant characteristics indicated thereby are that prerequisites have been created in this manner for in a boat transporting carriage, as stated in the preamble of claim 1, suggesting an arm structure adapted for said boat transportation carriage, wherein the boat transportation carriage is adapted to exhibit two elongated, parallel to, or at least essentially parallel to, frame portions disposed along the amidships or fore- and aft-plane of the boat and frame portions coordinated to each other, a first frame portion and a second frame portion, with a third frame portion adapted to interconnect said two frame portions within frame portion sections disposed adjacent to the bow of the boat and belonging to the front portions of the frame portions for forming a "U"-shaped chassis, said arm structure being adapted to exhibit on the one hand a vertically extending arm portion and on the other hand a horizontally, or essentially horizontally, extending arm portion, with the lower area or section of the vertically extending arm portion being in a rigid and solid connection with a freely movable area of the horizontally extending arm portion, the forwardly directed area of which is over a vertically extending axis of rotation rotatably disposed around said axis of rotation, and that the lower area of the vertically extending arm portion is to be adapted to directly or indirectly rest against a chassis belonging to the boat transportation carriage for taking up its allotted portion of the vertical loads which are to be referred from the deplacement of a boat supported by the boat transportation carriage so as to indicate that between the lower portion of the horizontally extending arm portion and said chassis and in connection with the vertically extending arm portion there is supposed to rest a supporting plate dimensioned primarily for vertical pressure forces and that this supporting plate is allotted to a supporting surface for supporting cooperation with the horizontally extended arm portion, with said supporting surface being disposed within a chosen intermediate area of said horizontally extending arm portion.

It is also suggested that the "U"-shaped chassis with its two elongated first frame portion and its second frame portion are to be attached to said third frame portion via rotational bearing arrangements for a small individual rotational movement between the first and/or the second frame portions and at an excess rotational movement having the third frame portion to take up the forces as torsion forces.

The subject matter that primarily must be considered to be characteristic of the present invention is disclosed in the characterizing portion of the following claim 1 and the characterizing portion of claim 15. Additional features related to the present invention are disclosed in the subclaims.

SHORT DESCRIPTION OF THE DRAWINGS

Known technology and a presently proposed embodiments exhibiting the significant characteristics allotted to the present invention will now be described more specifically as examples with reference to the accompanying drawing in which:

FIG. 1 is showing, in a perspective view, a boat transporting carriage, according to the present invention, without a boat but with a number of arm structures, and where boat supporting bands are adapted to extend between pair-wise oriented arm structures, FIG. 2 shows in two different views an earlier known and for sale offered boat transportation carriage, which must be considered to comprise the standpoint of technology which is considered to be closest to the present invention, wherein Figure "A" shows the boat transportation carriage in a lateral view whereas Figure "B" shows the boat transportation carriage in a horizontal view, FIG. 3 shows in different views a boat transportation carriage exhibiting the peculiarities associated with the present invention, wherein Figure "A" shows the boat transportation carriage in a lateral view, Figure "B" shows the boat transportation carriage in a horizontal view, Figure "C" shows the boat transporting carriage in an end view and Figure "D" shows the boat transporting carriage first frame portion in an enlarged section 3:1.

Figure 6:
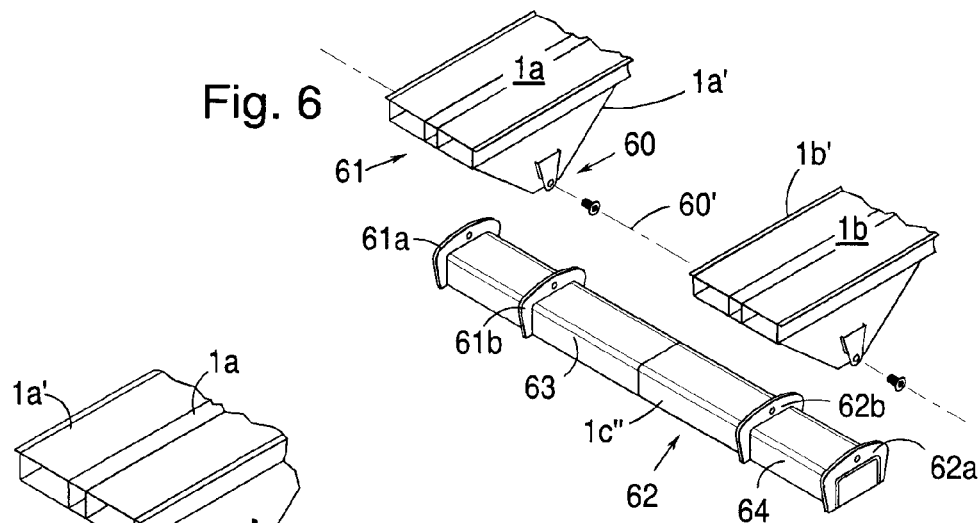
Figure 7:
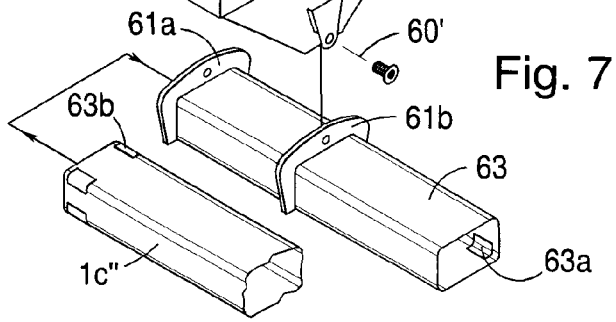

FIG. 4 shows lateral views of Figures "A" and "B" concerning the cooperation of a vertical arm portion with a horizontal arm portion, which may be rotated around a vertical axis of rotation, wherein said arm portion rests against a supporting plate, Figure "C" shows a plan view of the supporting plate in a horizontal view intended to be disposed between a horizontally disposed arm portion and a frame portion lying therebelow, and Figure "D" shows a portion of the supporting plate, which has the purpose of being able to cooperate slidingly with a frame portion disposed therebelow, FIG. 5 shows (maximized) possible horizontal rotative positions of the horizontal arm portion around its vertical axis of rotation for supporting the vertically disposed arm portion on the inner side of the frame portion, FIG. 6 is an exploded view of the arrangement between the first frame portion, the second frame portion and the third frame portion, in order to exemplify used rotational bearing arrangements and related to the embodiment disclosed in FIG. 1, and FIG. 7 is illustrating the orientation of axial bearing arrangements between sleeves and the third frame portion, related and illustrating to one of the frame portions.

DESCRIPTION OF THE PRESENTLY PROPOSED EMBODIMENT

By way of introduction it should be mentioned that in the following description of a presently proposed embodiment which exhibits the significant characteristics related to the invention and which is clarified by the figures shown in the following drawings we have chosen wording and specific terminology with the purpose of thereby primarily clarifying the gist of the invention.

However, it should be noted in this connection that the terminology chosen here is not to be seen as limited solely to the terms utilized and chosen here and it should be understood that every such chosen term is to be construed in such manner that it in addition will comprise all technical equivalents which operate in the same or essentially the same manner so as thereby to be able to achieve the same or essentially the same purpose and/or technical result.

Thus, with reference to the accompanying FIGS. 1, 3 to 7 the basic prerequisites of the present invention are shown schematically and in detail, with the significant qualities related to the invention concretized by the proposed and in the following with reference to these Figures more specifically described embodiments.

The present invention is shown in a perspective view in FIG. 1 and will be described more in detail with reference to FIGS. 3, 6 and 7, in the following.

Thus, FIG. 2 illustrates an arm structure 2, 2' adapted for a boat transportation carriage 1 of a known design.

The boat transportation carriage 1, according to Figures "A" and "B" in FIG. 1, is provided with six such arm structures, which are coordinated in pairs 2, 2' with a not shown carrier strap ("S" in FIG. 1) and each is defined as an arm arrangement.

The boat transportation carriage 1 is here adapted to exhibit two elongated, parallel to, or at least essentially parallel to, frame portions 1a, 1b disposed along the amidships, or fore- and aft-plane, of the boat and coordinated to each other.

A first frame portion 1a, a second frame portion 1b, and a third frame portion 1c, said third frame portion being adapted to connect said two frame portions 1a, 2b within forward directed frame portion sections 1a', 1b' and adjacently disposed with regard to the boat for forming a chassis given the shape of a "U", wherein said arm structure, such as 21, is adapted to exhibit on the one hand a vertically extended arm portion 22 and on the other hand a downwardly slanting, for example 45°, arm portion 23, with the lower portion 22' of the vertically extended arm portion 22 being rigidly and solidly connected to a freely movable 23a slanting arm portion 23, with the area 23b directed away from said movable area 23a being, over a vertically extended axis of rotation 24, rotatably disposed around said axis 24 of rotation and with the lower area 22' of the vertically extended arm portion 22 being adapted to rest directly or indirectly against a chassis "C" belonging to the boat transportation carriage and its frame portion 1b for taking up its allotted portion of the vertical loads that are to be counted from the deplacement of a boat supported by the boat transportation carriage 1.

FIG. 2 shows that the two arm portions 22, 23 are fixedly related to their frame portion 1b and rotatably disposed by means of said vertical axis 24 of rotation and that an occurring torque will be taken up solely by a fixed bearing 24a around the axis 24 of rotation and that this bearing 24a will have to be dimensioned for high vertical torques.

The present invention concerns a further development of the arm structure 2, 2' and 21, 23 shown and described in FIG. 2.

The same parts have in FIGS. 1 and 3 been allotted the same reference numerals as in FIG. 2.

Thus, the present invention particularly indicates, as in FIGS. 1 and 3, that between the lower area 23a of a horizontally extending arm portion 23 and said chassis "C" or frame portion 1b and in connection with the vertically extended arm portion 22 there rests a support plate 30 dimensioned primarily for withstanding vertical compressive forces, with this support plate 30 being allotted a supporting surface 30a (FIGS. 3 and 4) for supporting cooperation with the horizontally extended arm portion 23, and with this supporting surface 30a being disposed in a chosen intermediate area, covered by said horizontally extended arm portion 23.

The supporting surface 30a, in accordance with FIG. 5, is disposed in an intermediate area of between 70% and 20% of the total length of the horizontal arm portion 23, measured or counted between said axis 24 of rotation and a center line 22" allotted to said vertically extending arm portion 22.

The intermediate area is chosen to be covering an area of between 20% and 40% of the total radial length of the horizontal arm portion 23, counted from a center line 22" allotted to said vertically extending arm portion 22.

The support plate 30 is allotted a rectangular and horizontal extension with a lower surface facing one frame portion 1b of the chassis "C", with parallel edges 31, 32 of the rectangular surface extension and the lower surface being allotted parallel guides 32a for cooperation with parallel tracks 32b (or strips 32b) in the frame portion 1b or vice versa.

Figure "D" in FIG. 4 illustrates, in a greater scale 3:1, that the edge 32 (31) of support plate 30 is provided with a track or guide 32a intended to cooperate with a corresponding edge 32b of the upper part (not shown) of the frame portion 1b.

The supporting surface 30a is allotted a portion of a circular shape with a chosen radian measure, such as in degrees illustrated in FIG. 5.

Circular measure "a" is chosen to be 10° to 30° from a line "L1" which is parallel to the edge of one of its frame portions 1b in the direction of a second parallel frame portion (1a).

Circular measure "b" is chosen to be 60° to 90° from said line "L1" parallel with one of its frame portions 1b and in the direction of a second parallel frame portion (1a) for having the vertical arm portion 22 and a section of the horizontal arm portion 23 in a position located outside of the edge 32 of the support plate 30.

The vertical axis 24 of rotation is positioned within the support plate 30 and at a distance "a1" from the edge 31 of a support plate 30 of one of the portions "1b" which faces the other arm portion 1a corresponding to between 15% and 30% of a width "b1" allotted to support plate 30 between the edges 31 and 32 of said support plate, corresponding to the width of the frame portion 1b.

The supporting surface 30a having a counter surface 30b is given the shape of a segment of a circle allotted a radian measure such as "a" and "b" of between 30° and 110°.

A carrying strap (a sling "S" in FIG. 1)) not shown here or the like, for forming an arm arrangement designated 21+21'+ "S" in FIG. 3 "C", extends between two arm structures 21; 21', one for each of said two frame portions 1a, 1b.

At least two arm arrangements are provided with individual support plates 30, 30' both of which may be displaced along their associated frame portions 1a, 1b.

The vertical arm portion 22 and the horizontal arm portion 23 coordinated therewith are adapted to cooperate with said support plate 30, 30', which may be turned around with regard to the first 1a and/or the second frame portion 1b.

The vertical arm portion 22 and the horizontal arm portion 23 are, with regard to frame portion 1b or frame portions 1a, 1b, adjustable individually or in pairs in an arm arrangement 21+21'+"S", both in the lengthwise direction of the frame portion 1a, 1b and in the crosswise direction of the said frame portion.

The vertical arm portion 22 and the horizontal arm portion 23 having the right angle "c" achieve their stability by a chosen vertical rotatable installation 24 in supporting disc elements or plates 30 in combination with a guide in the form of an arc of a circle or a supporting surface 30b which surrounds a circular segment which is coordinated in stability and/or fastened in the horizontal arm portion 23 so as thereby to offer a center installation 24 of the vertical arm portion 22, which is dimensioned such as to be able to surround an air cylinder 28, which is adapted to a carrying supporting belts ("S"" in FIG. 1) which is not shown.

The vertical arm portion 22 is adapted to be able to be placed outside of the support element or plate 30 and the frame portion 1b with distributed vertical forces acting on the horizontal arm portion 23 and on the supporting frame portion 1b via said supporting element or plate 30 and the supporting surfaces 30a, 30b.

With reference to FIGS. 1, 6 and 7 the special features related to a first or a second embodiment is described more in detail.

Also here the boat transporting carriage is based upon a carriage 1, being adapted to exhibit elongated frame portions 1a, 1b, two of which are arranged parallel to, or at least essentially parallel to, each other, two of which are arranged disposable along or parallel to amidships plane of the boat and exhibiting a first frame portion 1a and a second frame portion 1b coordinated to each other, by a third frame portion 1c adapted to transversely connect said two frame portions within frame portion sections 1a', 1b', disposable adjacent to a bow of the boat, wherein said arm structures are each adapted to exhibit on the one hand a vertically extended arm portion 22, 22' and on the other hand an outwardly angled arm portion 23, 23', with a lower portion of the vertically extended arm portion being in a rigid and solid connection with a movable arm 23a of the angled arm portion 23, the removal-directed portion whereof being, over a vertically extending axis 24" of rotation, disposed rotatably around said axis of rotation, with the lower area of the vertically extending arm portion 22 being adapted to directly or indirectly rest against a chassis belonging to the boat transportation carriage and its frame portion 1a, 1b for taking up its allotted portion of the vertical loads which are to be referred to from the deplacement of a boat supported by the boat transportation carriage.

In FIGS. 1, 6 and 7 a carriage 1 having said elongated first frame portion section 1a' and said elongated second frame portion section 1b' coordinated to each other with said third frame portion 1c' via a rotational bearing arrangement 60, adapted for permitting a small individual vertical movement of said first 1a and second 1b frame portion in relation to said third frame portion 1c.

Each of two of said bearing arrangements 61, 62 are formed as a bolt and nut or the like arrangement.

Two bolt and nut arrangements 61a, 61b in FIG. 6 are related to the first frame portion 1a and its bow related section 1a', that two bolt and nut arrangements 62a, 62b are related to the second frame portion and its bow related section 1b'.

Two bolt and nut arrangements are each related to away facing outer surface sections of resp. frame portion sections 1a', and 1b'

A common rotation axis 60' is extending between said bolt and nut arrangements and said third frame portion 1c', shaped in a cross section as a hollow rectangular form or the like.

Said third frame portion 1c' and hollow sleeve arrangements 63, 64 are related to said first frame portion section 1a' and said second frame portion section 1b' and are exposing axial bearings.

Said axial bearings 63b are related to the ends of said third frame portion 1c" and axial bearings 63a are related to the ends of said sleeves 63, (64), facing towards each other.

Said first frame portion 1a and said second frame portion 1b are adapted to be arranged closely or adjacently to each other and side by side and in such a position exhibiting or exposing a breadth dimension adapted to a standard container for ship frights.

A first frame portion 1a related sleeve 63 and a second frame portion 1b related sleeve 64 are adapted in a compact orientation to cooperate with a shortened third portion 1c".

With reference to FIG. 7 it is illustrated axial bearings 63a, in the sleeve 63 for the third frame portion 1c and axial bearings 63b for the third frame portion 1c".

The invention is naturally not limited to the embodiment disclosed above as an example and can be subjected to modifications within the frame of the inventive concept illustrated in the following claims.

It should particularly be noted that each shown unit and/or circuit can be combined with every one of the other shown units and/or circuits within the frame of achieving the desired technical function.

The invention claimed is:

1. A boat transportation carriage, being adapted to exhibit elongated frame portions, two of which are arranged parallel to, or at least essentially parallel to, each other, two of which are arranged disposable along or parallel to an amidships plane of the boat and exhibiting a first frame portion, a second frame portion coordinated to each other, with a third frame portion, adapted to transversely connect said two frame portions within frame portion sections, disposable adjacent to a bow of the boat, wherein arm structures are each adapted to exhibit on the one hand a vertically extended arm portion and on the other hand an outwardly angled arm portion, with a lower portion of the vertically extended arm portion being in a rigid and solid connection with a movable arm of an angled arm portion, the removal-directed portion whereof being, over a vertically extending axis of rotation, disposed rotatably around said axis of rotation, with the lower area of the vertically extending arm portion being adapted to directly or indirectly rest against a chassis belonging to the boat transportation carriage and its frame portion for taking up its allotted portion of the vertical loads which are to be referred to from the deplacement of a boat supported by the boat transportation carriage, characterized in that between the lower portion of a horizontally extended arm portion and said chassis or frame portion and in connection with the vertically extended arm portion there rests a support plate dimensioned for primarily vertical pressure forces, said support plate being allotted a supporting surface for supporting cooperation with the horizontally extended arm portion, said supporting surface being disposed in a chosen intermediate area of said horizontally extended arm portion, wherein the lower portion of the vertically extending arm portion being adapted to rest directly against said support plate (30).

2. A carriage in accordance with claim 1, characterized in that the supporting surface is disposed in an intermediate area of between 70% and 20% of the total length of the horizontal arm portion, measured or counted between said axis of rotation and a center line allotted to said vertically extended arm portion.

3. A carriage in accordance with claim 1 or 2, characterized in that the intermediate area is chosen as between 20% and 40% of the total length of the horizontal arm portion, counted from a central line allotted to said vertically extending arm portion.

4. A carriage in accordance with claim 1, characterized in that the support plate is allotted a rectangular and horizontal surface propagation having a surface facing one of the frame portions of the chassis and that parallel edges of the rectangular surface propagation and the lower surface are allotted parallel guides for cooperation with parallel tracks in the frame portion or vice versa.

5. A carriage in accordance with claim 1, characterized in that the supporting surface is allotted a portion of circle shape, having a chosen circular measure, such as in degrees.

6. A carriage in accordance with claim 5, characterized in that the circular measure is chosen to be 10° to 30° from a line parallel with one of its frame portions and in a direction towards a second parallel frame portion.

7. A carriage in accordance with claim 5, characterized in that the circular measure is chosen to be 60° to 90° from a line parallel to one of its frame portions and in a direction from a second parallel frame portion.

8. A carriage in accordance with claim 1, 5, 6, or 7, respectively, characterized in that the vertical axis of rotation is disposed within the support plate and at a distance from an edge of a support plate for one arm portion which faces a second arm portion corresponding to between 15% and 30% of the width allotted to a support plate between the edges of said support plate.

9. A carriage in accordance with claim 8, characterized in that the supporting surface is shaped into a circle segment, allotted a circular measure of between 30° and 110 °.

10. A carriage in accordance with claim 1, characterized in that between two arm structures, exhibiting the characteristics of any one of the preceding claims 2 to 9, respectively, one for each one of said two frame portions, there extends a carrier strap or the like for forming an arm arrangement.

11. A carriage in accordance with claim 1 or 10, characterized in that at least two arm arrangements are disposed between individual support plates which are displaceable along their allotted frame portion.

12. A carriage in accordance with claim 1 or 10, characterized in that the vertical arm portion and the horizontal arm portion coordinated therewith are adapted to cooperate with a support plate, which is turnable with regard to the first and/or the second frame portion.

13. A carriage in accordance with claim 1 or 10, characterized in that the vertical arm portion and the horizontal arm portion are with regard to the frame portion or frame portions adjustable individually or in pairs in an arrangement, both in the lengthwise direction of the frame portions and in the crosswise direction of the frame portions.

14. A carriage in accordance with claim 1 or 10, characterized in that the vertical arm portion and the horizontal arm portion are adaptive to receive their stability by a chosen vertical rotatable installation in the support plate in combination with a guide in the form of an arc of a circle or a supporting surface which surrounds a circular segment which is stably coordinated with and/or affixed to the horizontal arm portion so as thereby to be offered a central attachment of the vertical arm portion which is dimensioned such as to be able to surround an air piston-cylinder arrangement adapted for a carrier strap.

15. A carriage in accordance with claim 14, characterized in that the vertical arm portion is adapted to be able to be placed outside of the support plate in the frame portion with distributed vertical forces acting on the horizontal arm portion and over the support disc on the supporting frame portion.

16. A carriage as stated in the preamble of claim 1, characterized in that said elongated first frame portion and said elongated second frame portion are coordinated to each other with said third frame portion via a rotational bearing arrangement, adapted for permitting a small individual vertical movement of said first and second frame portion in relation to said third frame portion.

17. A carriage as stated in claim 1 or 16, characterized in that each of two of said rotary bearing arrangements are formed as a bolt and nut arrangement or the like.

18. A carriage as stated in claim 1 or 16, characterized in that two bolt and nut arrangements are related to the first frame portion and its bow related section, that two bolt and nut arrangements are related to the second frame portion and its bow related section.

19. A carriage as stated in claim 1 or 16, characterized in that said two bolt and nut arrangements are each related to away facing outer surface sections of said first and second frame portion.

20. A carriage as stated in claim 19, characterized in that a common rotation axis is extending between said bolt and nut arrangements and said third frame portion, shaped in a cross section as a hollow rectangular form or the like.

21. A carriage as stated in claim 1 or 16, characterized in that said third frame portion and hollow sleeve arrangements related to said first frame portion and said second frame portion are exposing axial bearings.

22. A carriage as stated in claim 21, characterized in that said axial bearings are related to the ends of said third frame portion and to the ends of said sleeves, facing towards each other.

23. A carriage as stated in claim 1 or 16, characterized in that said first frame portion and said second frame portion are adapted to be arranged closely or adjacently to each other and in a side by side relation and in such a position exhibiting or exposing a breadth adapted to a standard container for ship frights.

24. A carriage as stated in claim 23, characterized in that a first frame portion related sleeve and a second frame portion related sleeve are adapted to cooperate with a shortened third portion.

\* \* \* \* \*